(12) United States Patent
Lütjens et al.

(10) Patent No.: US 6,667,349 B1
(45) Date of Patent: Dec. 23, 2003

(54) METHOD FOR PRODUCING OSMOTICALLY AND MECHANICALLY STABLE GEL-LIKE ANION EXCHANGERS

(75) Inventors: Holger Lütjens, Köln (DE); Reinhold Klipper, Köln (DE); Georg Martin, Langenfeld (DE); Alfred Mitschker, Odenthal (DE); Michael Holzbrecher, Engelskirchen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/673,090

(22) PCT Filed: Apr. 8, 1999

(86) PCT No.: PCT/EO99/02399

§ 371 (c)(1),
(2), (4) Date: Oct. 11, 2000

(87) PCT Pub. No.: WO99/54366

PCT Pub. Date: Oct. 28, 1999

(30) Foreign Application Priority Data

Apr. 21, 1998 (DE) .......................................... 198 17 679

(51) Int. Cl.$^7$ .............................. C08F 8/32; B01J 41/08
(52) U.S. Cl. ............................. 521/32; 521/25; 521/27; 521/31; 525/378; 525/379
(58) Field of Search ............................. 521/32, 25, 27, 521/31; 525/378, 379

(56) References Cited

U.S. PATENT DOCUMENTS

| | | | | |
|---|---|---|---|---|
| 2,616,877 A | * | 11/1952 | McMaster | 521/32 |
| 2,642,417 A | * | 6/1953 | Wheaton | 521/32 |
| 2,788,330 A | | 4/1957 | Gilwood et al. | |
| 3,509,078 A | | 4/1970 | Roubinek et al. | |
| 4,207,398 A | * | 6/1980 | Riener | 521/31 |
| 4,225,677 A | | 9/1980 | Boutier et al. | 521/31 |
| 4,235,972 A | * | 11/1980 | Jones | 521/28 |
| 4,320,070 A | * | 3/1982 | Cook, Jr. | 260/455 |
| 4,321,331 A | * | 3/1982 | Widiger, Jr. | 521/32 |
| 4,419,245 A | | 12/1983 | Barrett et al. | 210/681 |
| 4,427,794 A | | 1/1984 | Lange et al. | 521/28 |
| 4,444,961 A | | 4/1984 | Timm | 526/88 |
| 4,585,800 A | * | 4/1986 | Messing | 521/31 |
| 5,182,026 A | | 1/1993 | Pike | 210/688 |
| 5,523,327 A | | 6/1996 | Song et al. | 521/32 |
| 5,600,022 A | | 2/1997 | Ando et al. | 568/682 |
| 5,726,210 A | * | 3/1998 | Teraue | 521/32 |
| 5,834,524 A | | 11/1998 | Bloodworth et al. | 521/30 |
| 6,059,975 A | * | 5/2000 | Alexandratos | 210/683 |

FOREIGN PATENT DOCUMENTS

| | | |
|---|---|---|
| DE | 250128 | 9/1993 |
| EP | 062088 | 10/1982 |
| EP | 098130 | 1/1984 |
| EP | 101943 | 3/1984 |
| EP | 277795 | 8/1988 |
| EP | 327255 | 8/1989 |
| EP | 448391 | 9/1991 |
| EP | 481603 | 4/1992 |

OTHER PUBLICATIONS

*Chemical Abstracts, vol. 111, No. 18, Oct. 30, 1989, Columbus, Ohio, US; Abstract No. 155499d, Seite 82; XP000253104, Zusammenfassung, & SU 1 479 460 A (Plastmassy Scientific–Industrial Enterprises), May 15, 1989.

*Chemical Abstracts, vol. 84, No. 16, Apr. 19, 1976, Columbus, Ohio, US: Abstract No. 106533a, Seite 36; XP002088952, Zusammenfassung, & RO 57 961 A (Institutul De Chimie Macromoleculara "Petre Poni"), Nov. 4, 1974.

* cited by examiner

Primary Examiner—Fred Zitomer
(74) Attorney, Agent, or Firm—Godfried R. Akorli; Diderico van Eyl

(57) ABSTRACT

The present invention relates to a process for preparing gel-like anion exchangers by aminating crosslinked gel-like styrene divinybenzene bead polymers that contain halogenoalkyl groups in the presence of an inorganic salt and in the absence of organic solvents.

8 Claims, No Drawings

METHOD FOR PRODUCING OSMOTICALLY AND MECHANICALLY STABLE GEL-LIKE ANION EXCHANGERS

The invention relates to a process for preparing basic anion exchangers with improved mechanical and osmotic stability.

Nowadays there is a wide variety of interesting applications for anion exchangers. For example, they are used in treating drinking water, in preparing ultrahigh-purity water (needed for the computer industry in microchip production), for purifying and decolourizing sugar solutions and for removing heavy metal complexes from solutions.

For all of these applications it is desirable for the anion exchangers, which are in the form of beads, to retain their form and not to fragment or lose their structure, partially or completely, during use. If this happens, these polymer fragments can pass into the actual solutions to be purified and contaminate them during the purification process. The presence of damaged bead polymers is moreover detrimental to the functioning of the very anion exchangers used in column processes. Fragments cause increased pressure loss in the column system, thus reducing the throughput of liquid to be purified through the column.

Various factors affect the physical stability of the anion exchangers. These include the conditions of bead polymer preparation, and also the conditions of amination of the bead polymers prepared, which are aromatic, crosslinked copolymers containing haloalkyl groups.

The object of the invention was therefore to provide a process for preparing anion exchangers with improved stability. Surprisingly, it has now been found that this object is achieved by aminating the gel-like chloromethylate in an aqueous solution comprising small amounts of an inorganic salt.

The invention therefore provides a process for preparing gel-like anion exchangers by aminating crosslinked gel-like styrene divinylbenzene bead polymers which contain halogenoalkyl groups.

The base polymer is a crosslinked polymer of monoethylenically unsaturated monomers composed predominantly of at least one compound from the series styrene, vinyltoluene, ethylstyrene, α-methylstyrene and ring-halogenated derivatives of these, such as chlorostyrene.

In recent times, ion exchangers with a very uniform particle size (termed "mono-disperse" below) have become increasingly important, since the more advantageous hydrodynamic properties of an exchanger bed made of monodisperse ion exchangers can achieve economic advantages in many applications. One of the ways of preparing monodisperse ion exchangers is that known as the seed-feed process, in which a monodisperse nonfunctionalized polymer ("seed") is steeped in monomer, and this is then polymerized. Examples of patent specifications which describe seed-feed processes are EP-0 098 130, EP-0 101 943, EP-0 418 603, EP-0 448 391, EP-0 062 088, U.S. Pat. No. 4,419,245.

Another way of preparing monodisperse ion exchangers is to prepare the underlying monodisperse bead polymers by a process in which the uniform monomer droplets are formed by subjecting monomers to vibration while in laminar flow, and then carrying out polymerization, U.S. Pat. No. 4,444,961, EP-0 046 535.

A process carried out industrially for preparing anion exchangers starting from bead polymers based on styrene divinylbenzene (DVB) proceeds by first functionalizing (chloromethylating) the aromatic ring systems present in the bead polymers, using chloromethyl groups, and then reacting these with amines.

In the chloromethylation the crosslinked bead polymer based on styrene/divinyl-benzene (DVB) reacts with monochlorodimethyl ether using $Fe_2O_3$, $FeCl_3$, zinc chloride, tin(IV) chloride, aluminium chloride or other Friedel-Crafts compounds as catalysts, releasing methanol and other components—see EP-0 327 255.

The preparation of monochlorodimethyl ether is usually accompanied by the production of carcinogenic bischlorodimethyl ether. There are various versions of the process for preparing the monochlorodimethyl ether and for its reaction with bead polymers based on styrene divinylbenzene (DVB)—see EP-0 327 255, U.S. Pat. No. 4,225,677, U.S. Pat. No. 4,207,398, U.S. Pat. No. 5,523,327, DD-250 128, U.S. Pat. No. 4,207,398.

An excess of the chloromethylating agent is usually used, since this acts not only as an agent but also as a medium for steeping the bead polymer—see EP-0 776 911.

After the chloromethylation there are various ways of separating the remaining reaction medium, which in particular comprises monochlorodimethyl ether, from the chloromethylated bead polymer and for working up the chloromethylate.

JP-A-7-188 333 removes the remaining monochlorodimethyl ether by solvent extraction after the chloromethylation.

EP-0-776 911 meters in aqueous hydrochloric acid after the chloromethylation, heats the mixture to 110° C. and distils unreacted monochlorodimethyl ether. The chloromethylate is centrifuged and precipitates as a moist product.

EP-0-327 255 meters in methanol and formaldehyde, and, if desired, also methylal, after the chloromethylation. The mixture is stirred, and hydrochloric acid is metered in after about 1 hour. The monochlorodimethyl ether, both that already present and that newly formed, is distilled off. The chloromethylate is, if desired, washed with methylal, then with water, and then neutralized with aqueous sodium hydroxide.

EP-0 481 603 adds methanol after the chloromethylation in order to break down remaining monochlorodimethyl ether. The gel-like chloromethylate is then washed with methanol to remove by-products.

DD-250 129 separates off the chloromethylate after the chloromethylation via a frit, and then washes the product with methanol.

There are various ways of reacting the chloromethylate obtained to give anion exchangers, using various amines.

In industry use is often made of anion exchangers having tertiary—or quaternary ammonium groups. For example, use is commonly made of anion exchangers having trimethylamine and/or dimethyl-or hydroxyethylammonium groups.

EP-0 776 911 describes the amination of an aromatic, crosslinked copolymer containing haloalkyl groups. The actual copolymer is a porous bead polymer, prepared by suspension polymerization. Examples 1 to 4 describe the amination of porous chloromethylates in aqueous sodium chloride solutions with addition of toluene. The chloromethylate is reacted with an amine in the presence of at least 100 parts by weight of water per 100 parts by weight of chloromethylate, and at least 5 parts by weight of a water-soluble inorganic salt per 100 parts by weight of water, with addition of toluene. The amine used comprises trimethylamine, and the inorganic salt used comprises sodium chloride in the presence of organic solvents, such as benzene, toluene, xylene or dichloroethane. The temperature for the amination is 50° C. The resistance of the resultant anion exchanger beads to pressure was measured. The presence of at least 5% by weight of sodium chloride in the water during the amination considerably increases the resistance of the anion exchangers to pressure when comparison is made with the product prepared without sodium chloride.

U.S. Pat. No. 5,182,026 describes the amination of an aromatic, crosslinked copolymer containing haloalkyl groups. The actual copolymer is a porous bead polymer prepared by suspension polymerization. Examples 1 to 3 and A to C describe the amination of porous chloromethylates. The amination is carried out in two steps. The first reagents used are primary or secondary amines, resulting in reaction of from 15 to 95% of the haloalkyl groups. The partly aminated resin is then reacted with tertiary amines, such as trimethylamine or triethylamine, to give strongly basic anion exchangers. The first amination is carried out in water with addition of from 100 to 280 g of sodium chloride, and also of a base, such as NaOH, at temperatures from 60 to 100° C. The copolymer used may also comprise a gel-like polymer prepared by the seed process.

EP-0 481 603 describes the amination of gel-like copolymer beads prepared by a seed process. The bead polymers have core-shell morphology. This means that the poly-meric structure of the beads varies with the distance from the bead centres. During the haloalkylation, post-crosslinking takes place via introduction of methylene bridges. The post-crosslinked, chloromethylated gel-like bead polymer is aminated in steeping agents, such as water, or in a mixture of water with organic substances, such as methanol, methylal or methylene chloride, using aliphatic, secondary amines at temperatures between 60 and 100° C. A base, such as sodium hydroxide, is moreover added. Sodium chloride is not used. The secondary amines used in at least stoichiometric amounts comprise dimethylamine, diethylamine or dipropylamine. The functionalization introduces predominantly weakly basic groups into the resin. Post-crosslinking moreover produces amine bridges.

EP-0 327 255 describes the amination of a chloromethylated gel-like copolymer based on styrene and divinylbenzene. An aqueous slurry of the chloromethylate is mixed with aqueous sodium hydroxide. Gaseous trimethylamine is distilled into the autoclave. The mixture is stirred, first at 15° C. and then for 6 hours at 28° C.

EP-0 277 795 describes the amination of a chloromethylated styrene divinylbenzene copolymer. The copolymer contains from 0.5 to 2% by weight of divinylbenzene. The water-steeped chloromethylate is mixed in water with aqueous trimethylamine solution and stirred within the range between 5 and 35° C.

Another example impacts chloromethylate prepared from 100 g of copolymer. 74 g of sodium chloride, aqueous sodium hydroxide and aqueous trimethylamine solution are metered in. Distillation is then carried out beginning at temperatures between 0 and 20° C., to remove the trimethylamine. Fragmentation of all of the beads has occurred.

In another example the procedure is as above, but the beads are slurried in ethyl acetate. After the amination the anion exchangers are stable.

U.S. Pat. No. 4,419,245 chloromethylates gel-like copolymers based on styrene divinyl-benzene and prepared by the seed-feed process. One mole of chloromethylate is taken up in water and rendered basic (pH>13) using aqueous sodium hydroxide. 1.5 mol of anhydrous trimethylamine are metered in. The suspension is held for from 8 to 12 hours at room temperature, then heated to 100° C. to remove remaining amounts of amine.

In DE-19 634 393 methanol-moistened chloromethylate is reacted in 2.5% strength by weight aqueous sodium chloride solution with dimethylaminoethanol. Nothing is said about the stability of the resin. Since the chloromethylate is methanol-moistened, the amination is carried out in a water/methanol mixture.

The publications mentioned show that the reaction conditions for the amination substantially affect the stability of the resultant anion exchanger.

There is a need to prepare stable anion exchangers by a process which dispenses with the use of organic solvents and keeps the amount of inorganic salt—such as sodium chloride—as low as possible.

Specifically, residues of the organic solvents always remain within the resin and, when the resins are used as anion exchangers, contaminate the water to be purified. This requires complicated process technology moreover to separate off the organic solvent present in the reaction mixture after the amination. The amount of inorganic salt should be as low as possible, for environmental reasons and for cost reasons.

The present invention describes the preparation of an anion exchanger by reacting an aromatic, crosslinked copolymer containing haloalkyl groups with an amine. The amination is carried out in the presence of an aqueous solution of an inorganic salt. Any inorganic salt may be used, as long as it is water-soluble. This includes water-soluble halides, carbonates and sulphates of alkali metals, such as sodium and potassium, and of alkaline earth metals, such as magnesium and calcium. It is preferable to use sodium chloride.

The amount of the inorganic salt used is less than 5% by weight, based on the total amount of water. It is preferable to use from 1 to 4.5% by weight, particularly preferably from 1.5 to 4% by weight, of inorganic salt, based on the total amount of water. The total amount of water is that resulting from adding the amount of water added to the amount of water introduced in the aqueous amine solution.

The moisture content of the resin is not taken into account at this juncture.

Water serves various purposes during the amination. On the one hand it is a stirring medium and on the other it is a reaction medium or else solvent for the amine in the present invention.

During the amination the resin continuously takes up water and in doing so swells. A minimum amount of water is therefore necessary so that the mixture can at least be stirred. There is no particular upper limit for water. However, an upper limiting range results from the fact that using a very large amount of water gives a small concentration of the amine for a given molar ratio of amine to chlorine (in the chloromethylate). The space-time yield also becomes lower if the dilution used is very high. In addition, the amount of inorganic salt which has to be used for a given salt concentration increases.

At least 1.5 grams, preferably 3 grams, of water should be used per gram of bead polymer containing halogenoalkyl groups. It is preferable for chloromethylate to be used as halogenoalkyl group.

It is not necessary to add any organic solvent.

The aminating reagent used preferably comprises trimethylamine, triethylamine, tripropylamine, tributylamine.

If, for example, use is made of bead polymers containing chloromethylate groups, the amount of amine used is that required for the complete reaction of the chloromethylate. This must be at least 1 mol of amine, based on 1 mol of chlorine in the chloromethylate. It is preferable to use 1.15 mol of amine per mole of chlorine.

The temperature at which the amination is carried out may be in the range between room temperature and 160° C.

Preference is given to operating at temperatures of between 70 and 120° C., and particular preference to the range between 70 and 110° C.

After the amination, the liquid is separated off from the aminated bead polymer. For purification, the bead polymer is taken up using aqueous, dilute hydrochloric acid and stirred for from 1 to 6 hours at temperatures between 40 and 90° C.

The concentration of the hydrochloric acid may be in the range from 1 to 15% by weight, preferably from 2 to 5% by weight.

Measurement of Resin Stability

Determination of the number of perfect beads in original condition: 100 beads are studied under the microscope. The number of beads with cracks or fragmentation is determined. The number of perfect beads is given by the difference between 100 and the number of damaged beads.

Determination of the number of perfect beads by the swollen-stability test: 25 ml of anion exchanger are placed into a column into the chloride form. 4% strength by weight aqueous sodium hydroxide, high-purity water, 6% strength by weight hydrochloric acid and demineralized water are applied in succession, the aqueous sodium hydroxide and the hydrochloric acid flowing downwards through the resin and the high-purity water being pumped upwards through the resin. Time cycles produced by a control device are used for the elution. After 20 hours, 20 operating cycles have been completed. Once the operating cycles have ended, 100 beads are counted out from the resin sample. The number of beads in 100 damaged by cracking or fragmentation, i.e. imperfect, is determined.

Preparation of the Copolymer

The copolymer is prepared by the seed-feed process described in the applications EP-0 098 130, EP-0 101 943, EP-0 481 603, EP-0 448 391, EP-0 062 088, U.S. Pat. No. 4,419,245, and also in the example described in applications U.S. Pat. No. 4,444,961, EP-0 046 535.

The copolymer may moreover also be prepared by the processes described in U.S. Pat. No. 2,788,330 and U.S. Pat. No. 3,509,078, and also by processes in Vinyl and Related Polymers, C. Schildknecht, Wiley, 1952, pp.68–75.

EXAMPLE 1

Preparation of a Bead Polymer 3.59 g of boric acid and 0.99 g of sodium hydroxide are dissolved in 1160 ml of deionized water in a 4 l glass reactor. 190.5 g of a microencapsulated spherical styrene bead polymer with 0.5% divinylbenzene content are dispersed into this solution as seed (average particle size 215 $\mu$m). The microcapsule is composed of a formaldehyde-hardened complex coacervate made of gelatine and of a copolymer of acrylamide and acrylic acid. A mixture from 845 g of styrene, 48 g of acrylonitrile, 116 g of divinylbenzene (80%, commercially available isomer mixture of divinylbenzene and ethylbenzene) and 8 g of dibenzoyl peroxide (75%, commercially available water-moistened grade) is then metered in to the mixture over a period of 30 min, followed by stirring for 1 h. After this period 60 ml of a 2% strength by weight methylhydroxypropyl cellulose solution are added. The mixture is polymerized to completion by increasing the temperature, cooled, washed via a 32 $\mu$m screen and dried. This gives 1150 g of a regularly shaped bead polymer. The particle size distribution of the bead polymer (average particle size 400 $\mu$m) reflects precisely the particle size distribution of the seed.

EXAMPLE 2

Chloromethylation of a Bead Polymer

A mixture made from 1600 g of monochlorodimethyl ether, 165 g of methylal and 5 g of iron(III) chloride is charged to a 3 l sulphonating beaker, and 300 g of bead polymer from Example 1 then added. The bead polymer is steeped for 30 min at room temperature and heated to reflux temperature (55° C.) over a period of 3 h. Stirring is then continued for a further 1.75 h at reflux. During the reaction time about 275 g of hydrochloric acid and low-boiling organic compounds are driven off. The dark brown reaction suspension is then filtered off, the chloromethylate washed thoroughly with a mixture of methylal and methanol, then with methanol, then with high-purity water. This gives 680 g of water-moistened, chloromethylated bead polymer.

Chlorine content: 18.7%.

100 ml of chloromethylate moist from filtration weigh 65.9 g. This amount comprises 12.45 g of chlorine, corresponding to 0.351 mol.

EXAMPLE 3

Reaction of the Chloromethylated Bead Polymer From Example 2 With Trimethylamine 1179ml of high-purity water are charged to the autoclave. 136.4 g of sodium chloride are metered into the autoclave. 800 ml of chloromethylated bead polymer moist (with water) from filtration (corresponding to 527.3 g of dry chloromethylated bead polymer with a chlorine content of 18.7% by weight) and 401.3 g of 45% strength by weight aqueous trimethylamine solution are added to the mixture.

The suspension is heated to 120° C. over a period of 1 h and stirred for a further 3 hours at 120° C. After cooling to room temperature the mother liquor is filtered off with suction, the resin is mixed with 800 ml of high-purity water and stirred for 30 min at room temperature. The water is distilled off and replaced by 2000 ml of 3% strength by weight aqueous hydrochloric acid. The suspension is stirred for 4 h at 70° C. After cooling, the liquid is distilled off, the resin is taken up using water and eluted upwards in a column with 6 bed volumes of high-purity water. Yield: 2170 ml of resin after agitation.

EXAMPLES 4 To 9

The procedure was the same as that in Example 3, except that the amount of sodium chloride was varied.

EXAMPLE 10

The procedure was the same as that in Example 3, except that no sodium chloride was used.

Table 1 gives data on the amounts used for the various examples.

TABLE 1

| Example | 3 | 4 | 5 | 6 | 7 | 10 |
|---|---|---|---|---|---|---|
| Water in grams | 1179 | 1179 | 1179 | 1179 | 1179 | 1179 |
| NaCl in grams | 136.4 | 102.5 | 75.3 | 49.1 | 24.1 | 0 |

TABLE 1-continued

| Example | 3 | 4 | 5 | 6 | 7 | 10 |
|---|---|---|---|---|---|---|
| 45% strength by weight trimethylamine solution (TMA) in grams | 401.3 | 401.3 | 401.3 | 401.3 | 401.3 | 401.3 |
| Water in the TMA solution in grams | 220.7 | 220.7 | 220.7 | 220.7 | 220.7 | 220.7 |
| Total amount of water | 1399.7 | 1399.7 | 1399.7 | 1399.7 | 1399.7 | 1399.7 |
| % by weight of sodium chloride, based on the amount of water | 9.75 | 7.32 | 5.38 | 3.51 | 1.72 | 0 |

Table 2 gives results from the testing of the final products.

TABLE 2

| Example | 3 | 4 | 5 | 6 | 7 | 10 |
|---|---|---|---|---|---|---|
| Number of perfect beads in original condition per 100 | 98 | 99 | 98 | 98 | 96 | 97 |
| Number of perfect beads in the swelling-stability test per 100 | 97 | 97 | 97 | 98 | 92 | 87 |
| Exchange capacity in mol/l of resin | 1.331 | 1.307 | 1.288 | 1.324 | | 1.312 |
| Residual chlorine content in % by weight | 0.33 | 0.15 | 0.071 | 0.068 | 0.41 | 0.05 |

The data in Tables 1 and 2 show that use of a 1.72% strength by weight sodium chloride solution (Example 7) compared with a purely aqueous solution (Example 10) increases the swelling stability of the beads from 87 to 92 perfect beads. Use of a 3.51% strength by weight sodium chloride solution (Example 6) increases the stability to 98% of perfect beads. Further increase of the sodium chloride concentration does not give any increase in stability. In contrast, the stability value decreases by one point.

What is claimed is:

1. A process for preparing osmotically and mechanically stable gel-like monodisperse anion exchangers comprising aminating a crosslinked, gel-like monodisperse styrene divinylbenzene bead polymer having halogenoalkyl groups by reaction with trimethylamine, triethylamine, tripropylamine, or tributylamine in an aqueous solution of an inorganic salt, wherein the inorganic salt is a water-soluble halide, carbonate, or sulphate of an alkali metal or alkaline earth metal used in an amount that is less than 5% by weight based on the total amount of water.

2. A process according to claim 1 wherein the amination is carried out in the absence of organic solvents.

3. A process according to claim 1 wherein the amination is carried out at a temperature between room temperature and 160° C.

4. A process according to claim 1 wherein 1.5 grams of water are used per gram of the dry bead polymer.

5. A process according to claim 1 wherein the halogenoalkyl groups are chloromethyl groups.

6. A process according to claim 5 wherein complete amination is carried out using at least 1 mol of an amine per 1 mol of chlorine in the chloromethyl groups.

7. A process according to claim 1 wherein 1 to 4.5% by weight of the inorganic salt is used.

8. A process according to claim 1 wherein 1.5 to 4% by weight of the inorganic salt is used.

* * * * *